(12) United States Patent
Smith (10) Patent No.: US 9,103,668 B2
(45) Date of Patent: Aug. 11, 2015

(54) LASER GENERATED MEASURING DEVICE

(71) Applicant: Michael Vincent Smith, Media, PA (US)

(72) Inventor: Michael Vincent Smith, Media, PA (US)

(*) Notice: Subject to any disclaimer, the term of this patent is extended or adjusted under 35 U.S.C. 154(b) by 273 days.

(21) Appl. No.: 13/749,652

(22) Filed: Jan. 24, 2013

(65) Prior Publication Data

US 2014/0202013 A1    Jul. 24, 2014

(51) Int. Cl.
*G01B 5/00* (2006.01)
*G01C 5/00* (2006.01)
*G01C 3/08* (2006.01)

(52) U.S. Cl.
CPC ... *G01C 5/00* (2013.01); *G01C 3/08* (2013.01)

(58) Field of Classification Search
CPC ...... G01C 5/00; G01B 11/005; G01B 11/007; G01B 21/047; G01B 2210/58; G01B 5/008; G01B 5/012; G05B 19/401; G05B 2219/33162; G05B 2219/37193; G05B 2219/40233; G05B 2219/45061
USPC ............................................. 33/286, DIG. 21
See application file for complete search history.

(56) References Cited

U.S. PATENT DOCUMENTS

| | | | |
|---|---|---|---|
| 5,206,697 A * | 4/1993 | Schwartz | 356/5.06 |
| 5,410,141 A * | 4/1995 | Koenck et al. | 235/472.02 |
| 8,875,409 B2 * | 11/2014 | Kretschmer et al. | 33/503 |
| 2010/0085556 A1 * | 4/2010 | Bedwell et al. | 356/4.02 |
| 2014/0202013 A1 * | 7/2014 | Smith | 33/286 |

* cited by examiner

*Primary Examiner* — Yaritza Guadalupe-McCall (57) ABSTRACT

The present invention relates to a laser-based measuring device which can be used to measure geometrical sizes and lines of a plane from a distance away. The device comprises a hand-held or mountable housing unit containing a laser projector, two pivotally fixed mirrors moveable by a first and second motor respectively, and at least one range finder, wherein the laser generates a visible line whose width is determined by the on time of the laser the angle of reflection of the first mirror and the rotational speed of the second mirror. The range finder(s) project the laser beam through a marked lens which then illuminate a ruled line or grid upon the planar surface to be measured.

16 Claims, 8 Drawing Sheets

Front　　Side (b)　　Back-Switch (c)　　Bottom (d)

Figure 5

Front    Side (b)    Back-Switch (c)    Bottom (d)

LASER GENERATED MEASURING DEVICE

CROSS-REFERENCE TO RELATED APPLICATIONS

This application claims the benefit of priority of U.S. Provisional Appln. No. 61/590,396 filed on Jan. 25, 2012.

FIELD OF THE INVENTION

The present invention relates generally to methods and devices to measure distances conventionally measured by rulers, yard sticks and tape measures on lateral and planar areas in two dimensions. More specifically, the present invention relates to the use of lasers which can be used to measure geometrical sizes and lines of a plane from a distance away.

BACKGROUND OF THE INVENTION

There have been many hundreds, if not thousands of devices and methods developed over the centuries for measuring distances. Planar and lines are distances conventionally measured by rulers, yard sticks and tape measures in two dimensions. The relatively recent development of the laser beam has revolutionized many industries and the use of the laser has also been used to focus and calculate certain lengths and levels. Laser levels have been used in construction for many years. They typically seek to produce a plane of light for a reference for construction projects. Laser levels have been used for large scale construction projects like commercial excavating, laying foundations, and installing drop ceilings. Laser levels save considerable time during initial layout of a construction job compared to other tools such as beam levels, chalk lines, or torpedo levels. Some examples of jobs where laser levels are useful include laying tile, mounting cabinets, installing counter tops, and building outdoor decks.

The alignment of surfaces is a perennial problem in a variety of fields, ranging from construction to interior decorating. Alignment is necessary for walls that should be perpendicular to a floor, or otherwise plumb. Masonry and bricklaying practitioners are well aware of the importance of plumbed and aligned surfaces and chalk lines. A home interior decorated with pictures and other wall ornamentation makes a much better appearance when the ornamentation is aligned, especially with respect to vertical or horizontal alignment. Many mechanical and electrical alignment devices are available, and some laser devices are available. However, some of these products are cumbersome, and others are not suitable for certain uses. Chalk lines, for instance, are sometimes undesirable for use in finished, interior areas.

In the construction industry, drawing an extension line from a reference line is usually done by applying a ruler or using an ink-string box. The reference line can be corner lines, fence lines, or any horizontal or vertical line defined by a square-beam leveler or other device. When applying a ruler to draw the extension line, one side of the ruler is used to be aligned with the reference line and the extension line can be formed by using a second ruler as an extension of the aforesaid ruler to elongate the reference line. Though this method can be accurate, this accuracy is only limited to short distances.

The ink-string box in the art comprises a box for carrying a roller at one half and ink at another half. The roller is pivoted on top of the box, and an extension string rolled around the roller. The extension string has a free end that is pulled over the ink and away from the box. While applying the ink-string box to draw an extension line of a reference line, the string is pulled out from the roller and mixed with the ink during the pulling operation, then aligned with the reference line, and then the extension line is formed by flipping the extended inked string to drop the ink lengthwise. Even though the ink-string box is suitable for use in medium or long distance applications, the operation of flipping the inked string is quite human-dependent and may need to be done in segments if a substantial length of string is to be pulled. Thus, a unique straight extension line may sometimes be difficult to achieve by applying the ink-string box and may be subject to human error.

Thus, there remains a need for a line-extension tool that provides accurate alignment and is effective for use in distances of all ranges, yet is easy to use and can be used quickly and efficiently. Because these laser levels can typically cost thousands of dollars, only those who regularly land larger construction projects can justify purchasing a laser level. Laser levels have not achieved widespread adoption by the general public despite the time savings because of their initial cost of ownership. The expense can be attributed to the cost of suitable laser sources such as He-Neon laser and associated optical system used to manipulate the beam generated by the laser source. Laser distance finders have advantages of being convenient for use, high accuracy, and short measuring time. Laser distance finders are widely used in a variety of applications, such as architecture, exploration and construction.

Leveling and/or plumbing devices are used in construction or other applications for marking or determining the level or plumb orientation of an object or surface. Many devices of this type utilize a laser generator that emits a beam of light, typically in a fan-type planar configuration, to provide the user with a visual representation of level or plumb on a surface. In order to fix the orientation of the device relative to the surface, which may be a floor or wall, it has been known to provide the device with extendable and retractable pins, which penetrate the surface and serve to temporarily secure the device to the surface.

While this type of temporary mounting arrangement functions satisfactorily to fix the position of the device relative to the surface, it is disadvantageous in that the pins leave holes in the surface that must be filled after use. In addition, this type of mounting arrangement does not allow slight alterations in the orientation of the device after engagement with the surface, in the event the device is not truly level or plumb when the pins are first inserted into the surface. Furthermore, this type of mounting arrangement can only be employed when the device is used on a surface that is capable of being penetrated by the pins. Accordingly, a temporary mounting arrangement of this type cannot be used on hard surfaces such as concrete, tile or the like.

A known laser distance finder usually comprises a laser generating device, a collimating lens positioned at an emitting end of the laser generating device for converting a laser beam generated from the laser generating device into a collimating measuring beam, a receiving lens disposed on one side of the laser generating device for receiving a reflected measuring beam from an object to be measured and focusing it into an image, an optoelectronic detector disposed in the distance finder for receiving the image of the reflected measuring beam and converting optical signals therein into corresponding electrical signals which is processed to obtain a distance measuring result.

U.S. Pat. No. 8,069,578 to Wright discloses a laser mounting tool to project a beam of light from a point aligned with a longitudinal edge of a first molding segment along the wall to locate and permit marking of the position of a corresponding second molding segment longitudinal edge. U.S. Pat. No.

6,195,902 to Jan et. al. teaches and claims a laser extender for accurately elongating a reference line. The laser extender includes a housing, a battery set, and a laser unit. The housing has an external basic flat plane for resting upon a flat surface and having a straight edge that is adapted to be aligned with a reference line, an internal accommodating space, and a plurality of holes for accessing the internal laser to the outside exterior of the housing. The battery set is provided inside the internal accommodating space. The laser unit, utilizing power provided by the battery set, is located inside the internal accommodating space for generating a spanning plane laser beam perpendicular to the basic flat plane of the housing and for extending the reference line defined by the straight edge. In addition, the laser extender can engage a beam leveler for enhancing the leveling ability of the laser extender.

U.S. Pat. No. 7,609,364 to Zhao et. al. discloses a laser distance finder comprising a laser generating device, a collimating lens positioned in a laser emitter end direction of the laser toward a desired distance to be measured. A generating device forward situated lens converts the laser beam generated from the laser into a collimating measuring beam while a receiving lens receives a reflected measuring beam from an object to be measured and focuses it into an image. An optoelectronic detector disposed in the distance finder receives the image of the reflected measuring beam and a reflective member is rotatably-mounted in an optical path of the collimating measuring beam via a rotating shaft. This is detector is capable of rotating to a blocking position and a non-blocking position around the rotating shaft. A transmission part located at one end of the reflective member has an interval apart from an axis of the rotating shaft. A worm having a plurality of teeth is connected to a motor. The transmission part engages with the teeth of the worm.

SUMMARY OF THE INVENTION

The present invention comprises a laser generated measuring device or "laser ruler" for measuring lateral distances on a fixed planar surface such as a wall, floor or ceiling. In operation, a fixed position, pulse-able laser is aimed at a rotating mirror. When the laser-rule device is turned on, the laser generates a visible line whose width is determined by the on time of the laser and the rotational speed of the mirror. The spacing of the illuminated lines is determined by the duty cycle of the laser. A 10% duty cycle produces lined spaces that are ten times wider than the actual slit lines in the device, i.e., a six inch spatial slit in the device for laser projection will span about 60 inches latitudinally across the planar surface to be measured. The system operates in a continuous sweep mode and a quantitative reading is obtained by placing an object on the desired line; the range finder would determine the distance from the base of the laser-ruler to the object and provides the distance on a numeric display conveniently located on the device.

DETAILED DESCRIPTION OF THE INVENTION

Figure 1:
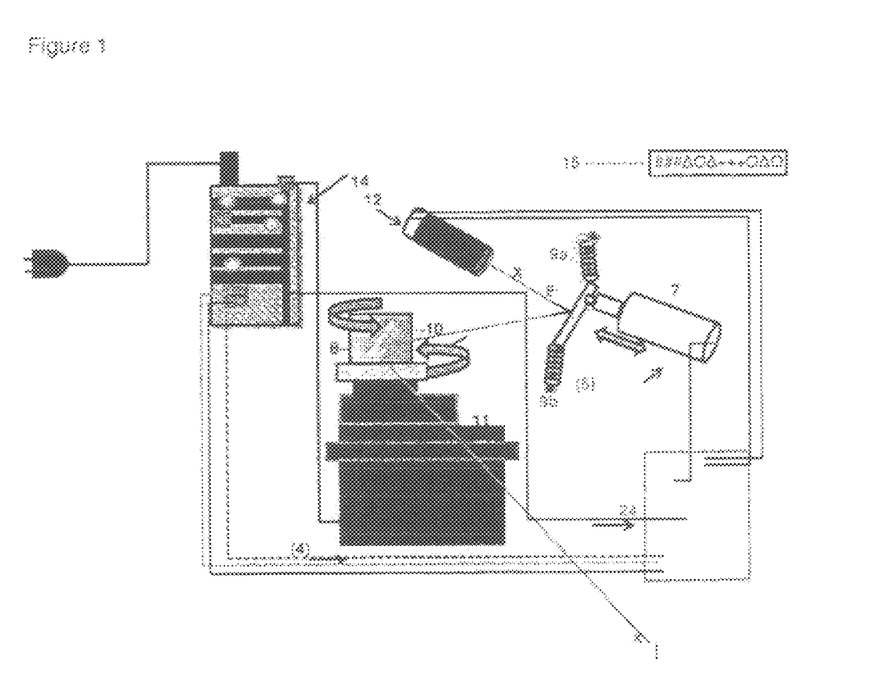
FIG. 1 is a block diagram of an internal schematic view of the elements of the laser-ruler device of the present invention showing the operable parts that comprise the laser ruler of the present invention.

As shown in FIG. 1, the laser measuring device (2) is shown in toto in a cut-away view to show the internal parts. The system uses two motor (4, 6) driven mirrors (8, 10) with a stationary laser (12). The first mirror (8) controls the width of the ruler line (14) by oscillating over a very small angle back and forth. The second mirror (10) moves in discrete steps with angle theta=tan-1(I×delta/distance) {I=−N, . . . −1,0,1, . . . N} for 2×N steps. Using the inverse tangent allows the spacing of the grid marks to remain the same regardless of the distance to the surface from the laser rule.

The line width is proportional to the angle of oscillation (a). Since the angle can be modified one tick line at the time the ruler can have major and minor lines. The laser generator (12) is projected directly at the plane to be measured, i.e., a wall or floor, because the typical laser beam projected by commercially available devices is too wide and if it is projected or emitted at a steep angle, the beam projects as a thick line. Notwithstanding this result, the present invention comprises an device using a laser beam projected at both angles, straight-on and at a steep angle.

The laser (12) pulses a beam when the second mirror (10) is stationary and there is no pulsed beam when the mirror (10) is moving. A standard circuit board (24) connects and coordinates the pulsed laser beam emissions with each turn or movement of the second mirror (10) This provides straight, disconnected lines as provided by a ruler measure. See FIG. 2. This can also be added to the disconnected line by the generation of continuous laser pulses against the two mirrors The system is controlled by a programmable micro-computer (14) that controls the two motor drivers (7,11). The system is programmed in the "C" language and loaded on the microcontroller 14 via a USB bus 5 making the system flexible and easy to program.

The laser ruler of the present invention as shown in FIG. 1, comprises a laser diode (LD) module 12 for emitting a collimating measuring beam X, which is fixedly mounted at one end of a brace (not shown). A mirror 8 is mounted on expandable, retractable springs (9a, 9b) mounted in the laser ruler casing. A collimating lens 15 is disposed in an emitting end direction of the laser generating device. The laser generating device and the collimating lens can be mounted on the brace directly. A receiving lens 9 disposed on one side of the LD module 4 is mounted at a front end of the brace, and an opto-electronic detector 3 located at a focus point of the receiving lens 9 is mounted at a back end of the brace 1. In the preferred embodiment, the receiving lens 9 is a convex lens, while in other embodiments the receiving lens 9 can be any other suitable lens. The opto-electronic detector 3 may be avalanche photodiode, or PIN photodiode, or other detecting elements or devices. In other embodiments, the laser generating device and/or the collimating lens can be disposed on the optical axis of the receiving lens 9.

The laser ruler device (2) of the present invention also contains four range finders 15 designated ###, Δ○Δ, +++, and ○Δ○ in FIG. 1, one for distance to the surface, one each for left and right and one for the ceiling. These are known in the art and commercially available from LaserTech Inc., Bushnell and TruPulse Inc. Preferred are those that provide horizontal and vertical distance flexible height routine determinations. The range finders are connected to the micro-controller and feed the distances thereto. This assures that correct quantitative values with respect to left, right, up and down measurements will be projected on the surface from the laser. In addition, with the simultaneous use of two units described above, one vertical and one horizontal, it is possible to simultaneously display distance from either walls and from ceiling and floor. That is having two rulers on the surface at the same time one vertical and one horizontal. See FIGS. 4-7. An entire grid pattern could be projected on a surface if desired.

A fixed position pulse-able laser is aimed at the rotating mirror (10). When turned ON, the laser generates a visible line whose width is determined by the period of time that the laser 7 is turned ON and the rotational speed of the mirror. The spacing of the illuminated lines (FIG. 2 a-f) is determined by the duty cycle of the laser, i.e, the percent of time that the mirror moves as a fraction of the total time under consideration. The duty cycle means the power is on X % of the time and off Y % of the time depending on how long the device's period is. Here one period is the length of time it takes for the device to go through a complete on/off cycle. A 10% duty cycle would produce spaces that are ten times wider than the lines. This can be improved by using a stepper motor to provide a hold time when the laser is ON. All of the parameters obviously vary according to the approximate size and dimensions to be measured and are easily determinable by one skilled in the art. For example, inn a periodic event such as the rotational movement of the mirror (10) the duty cycle is the ratio of the duration of the event to the total period of a signal.

$$\text{duty cycle } D = \frac{\tau}{T}$$

where

τ is the duration that the function is active, and.

T is the period of the function.

The system operates in a continuous sweep mode and the height above the surface of the rotating mirror will be need to be about ten times the span of the device. In other words, a six (6) inch high unit would create a span about 60 inches or five feet). A quantitative reading would be obtained by placing an object on the desired line; the range finder would determine the distance from the base of the laser ruler to the object and provides the distance on a numeric display located on the laser ruler. The laser (Laser Manufacturing Inc., Pfleugerville Tex.) pulses ON when the second mirror is stationary and OFF when it is moving. This provides straight disconnected lines similar to that of a ruler. It is also possible to add lasers of different colors and by selectively pulsing them as appropriate create a projected ruler comprised of major and minor ticks of different colors. The lens of the device from which the laser exits the body of the unit comprises a transparent glass or plastic lens inscribed with a grid or ruler liner that provides correct quantitative values when the laser beam is focused left, right and up and down and projected on the surface of the plane to be measured.

Figure 8:
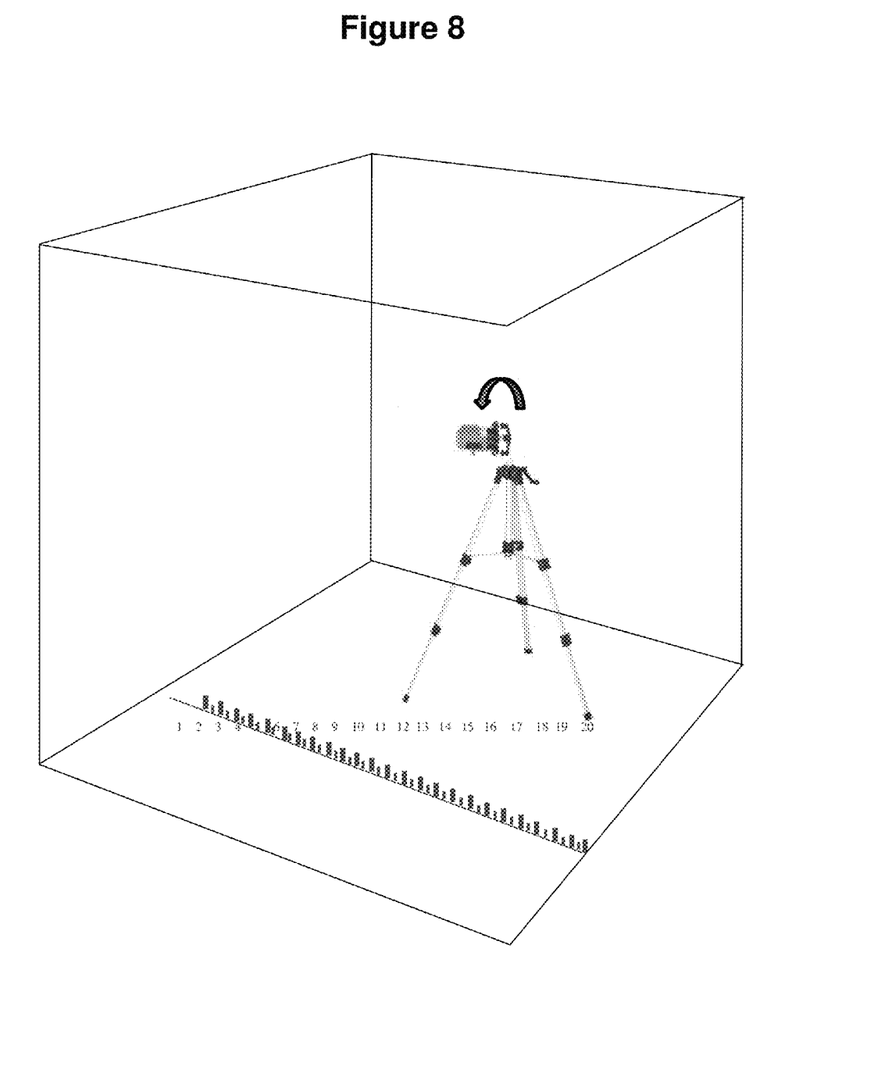
FIG. 8 is the full diagram of the embodiment shown in FIG. 4 in operation wherein the laser is turned on in the measurement mode whereby the ruler image is projected against a floor to be measured.

Numbering can also be added with a combination of ON/OFF pulsing and properly positioning the two mirrors. The easiest numbering to use would be numbers formed from a square FIG. 8. The laser pulses ON when the second mirror is stationary and OFF when it is moving. This provides straight disconnected lines as you would expect from a ruler. Further, it is possible to add lasers of different color and by selectively pulsing them as appropriate create major and minor ticks of different colors. Numbering can also be added with a combination of ON/OFF pulsing and properly positioning the two mirrors. The simples numbering to use would be numbers formed from a square FIG. 8. The second motor (G Motor Industrial Limited), moves mirror (10) in discrete steps with angle theta=tan−1(I times delta/distance) {I= −N, . . . −1,0,1, . . . N} for 2×N steps. Using the inverse tangent allows the spacing of the grid marks to remain the same regardless of the distance to the surface from the laser rule. The system also contains four (4) range finders (Shaanxi Shinhom Enterprise Co. Ltd), one for distance to the surface, one each for left and right and one for the ceiling. This permits correct quantitative values with respect to left, right, up and down to be projected on the surface. The first mirror (A) controls the width of the ruler line by oscillating the motor over a very small angle back and forth. The line with is proportional to the angle of oscillation. Since the angle can be modified one tick line at the time the rule can have major and minor lines. In addition, with the simultaneous use of two units described above, one vertical and one horizontal, it is possible to simultaneous display distance from either walls and from ceiling and floor which results in the projection of two rulers on their surfaces at the same time. See FIG. 3.

Figure 2:
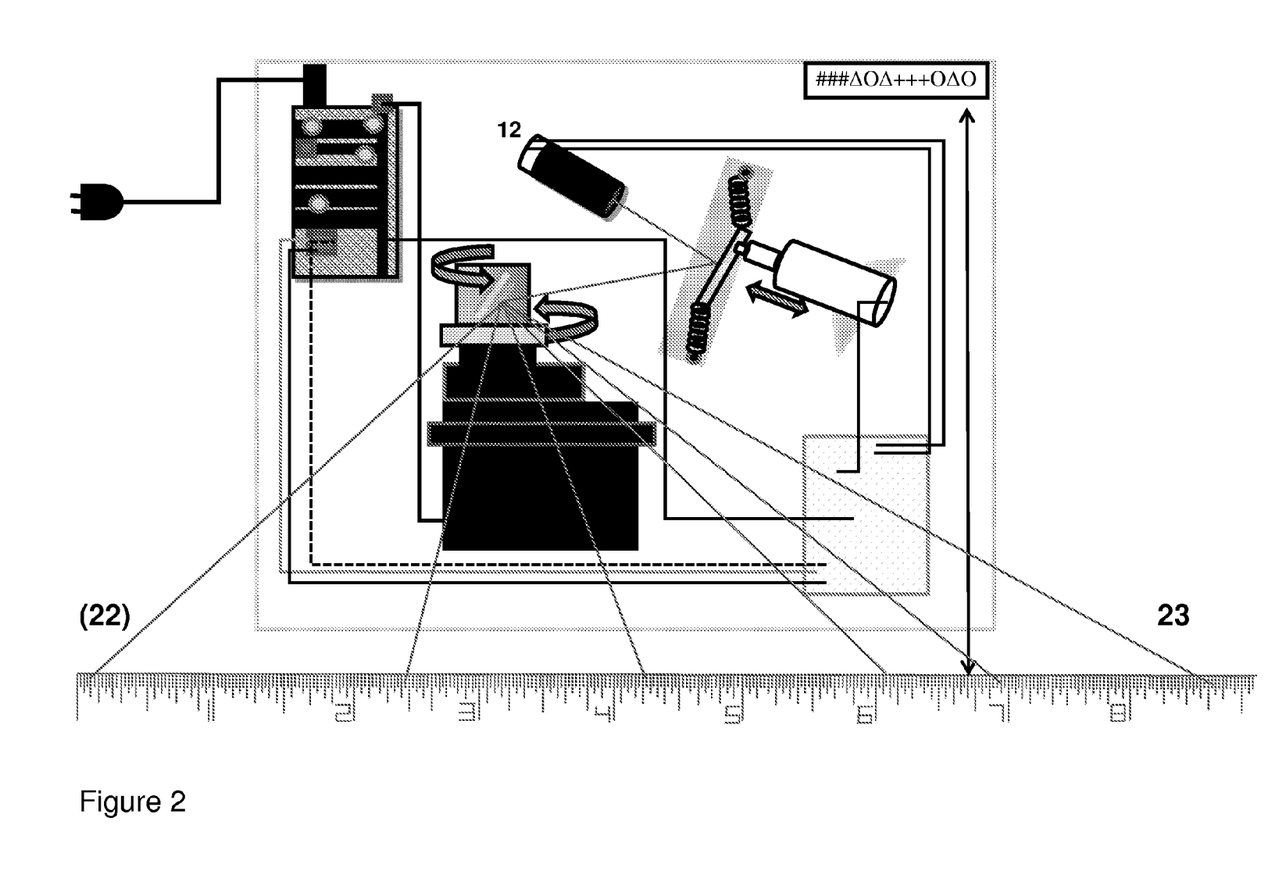
FIG. 2 is a block diagram of an internal schematic view of the elements of the laser-ruler device of the present invention showing how the laser pulses on when the second mirror is stationary and is off when it is moving.

Referring now to FIG. 2, the block diagram of the laser-ruler device of the present invention shows how the laser pulses on when the second mirror 10 is stationary and is off when it is moving. The laser 12 is directed towards the first mirror (8) which is angled by the first motor (6) as desired according to the approximate distance to the planar surface to be measured. The first and second motors (6, 8) are positioned and syncopated by the programmed by the micro-controller (14) via the circuit board (20). This provides straight disconnected lines similar to that of a ruler. The first mirror controls the width of the ruler line by oscillating over a very small angle back and forth. The line with is proportional to the angle of oscillation. Since the angle can be modified one tick line at the time the rule can have major and minor lines. The second mirror rotates and directs the beam over the plane to be measured and divides it up into the minor, smaller lines. Since the "firing" of the laser can programmed into micro-seconds, the beams' emission can be modified one tick line at a time across the latitudinal axis of the planar surface to be measured thereby projecting the major 26 and minor 28 lines.

Referring again to FIG. 3 the embodiment shown in FIGS. 1 and 2 are shown from a top-view perspective in operation wherein the laser is turned on in the measurement mode and the ruler image (laser tape measure) is projected against a plane or surface to be measured upon which the device rests. Referring now to FIG. 4 (a-d) the laser, motor, micro-processor and mirrors as shown in FIG. 1 are embodied in a casing and shown from a top, front and side perspective. The laser measurement device is also shown detachably mounted on a tripod. The device comes with a tripod for ease of projection and is detachable with a possible wall mount hook. The front of the device 4(a) contains a centrally disposed exit port or lens from which the laser beam is emitted and projects on towards the surface to be measured. The bottom of the casing 4(d) comprises a substantially planar base attachment plate for securing the laser ruler to the tripod stand or other means to steady the device so the accurate measurements can be taken. The base plate 7 can also be seen in the side view 4(b) as it is essentially circular in design to allow for complete 360° rotation about the vertical axis of the tripod stand. The base plate 7 is designed so that it is removeably attached to a pivotal clamp at the apex of the tripod. FIG. 4(c) shows the rear of the device with the centrally disposed on-off switch. The laser measuring device of the present invention is portable and may either have a power cord (20) for power from an AC power source or may be battery powered as well. Further, another embodiment of the present invention would utilize laser beams of different colors and by selectively pulsing them create major and minor ticks of different colors on the planar surface, i.e., wall, floor or ceiling.

Figure 3:
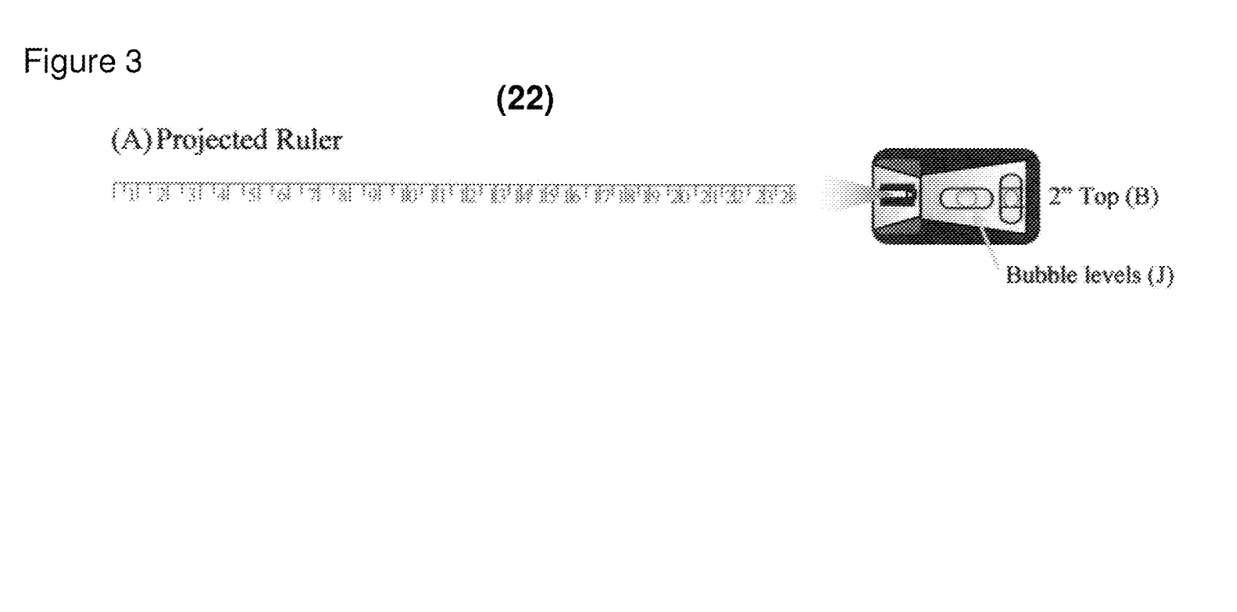
FIG. 3 is a top view of the wherein the laser, motor, microprocessor and mirrors as shown in FIGS. 1 and 2 are embodied in its casing with planar levels incorporated therein and the laser ruler scan is projected from the range finder lens across a planar surface below.
Figure 4:
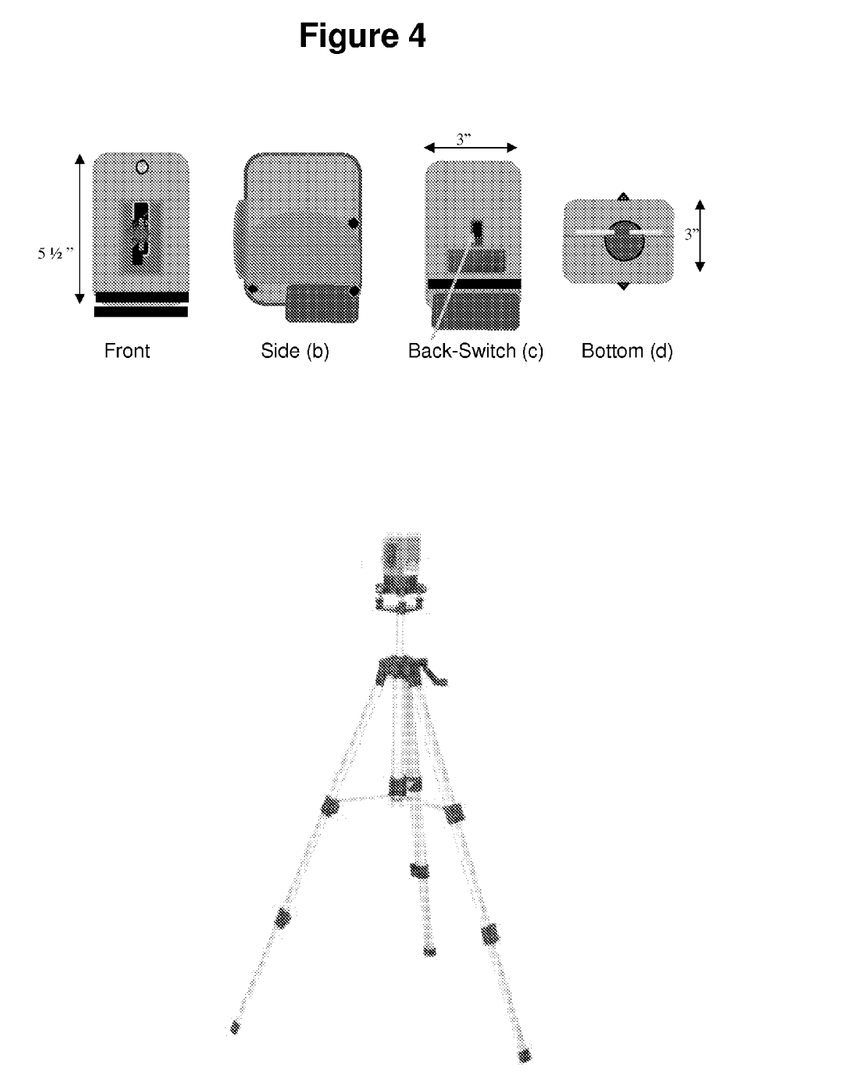
FIG. 4 is four side and top views of laser casing embodiments of the invention wherein the actual laser, motor, microprocessor and mirrors as shown in FIG. 1 are embodied in its casing and swivel-ably mounted on a tripod
Figure 5:
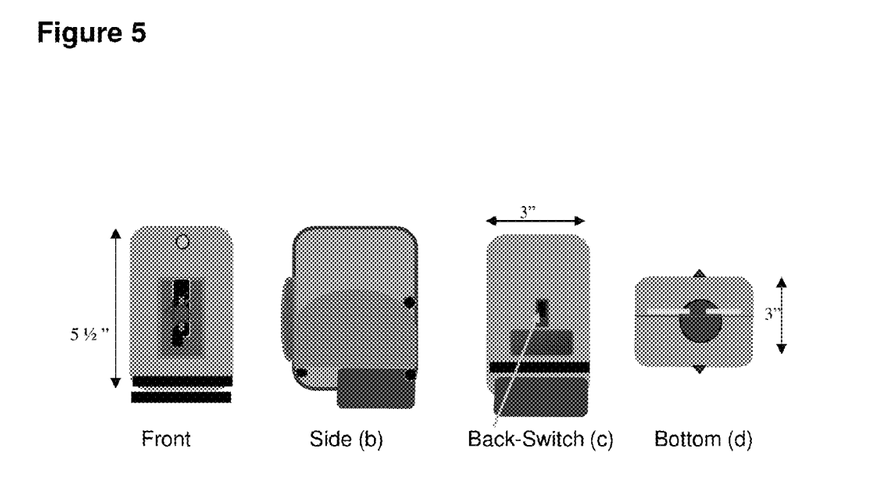
FIG. 5 is the full diagram of the embodiment shown in FIG. 4 in operation wherein the laser casing is detached from its' tri-pod and shows how the laser ruler has the ability to rotate 360 degrees which allows for accurate measurement on any planar surface.
Figure 6:
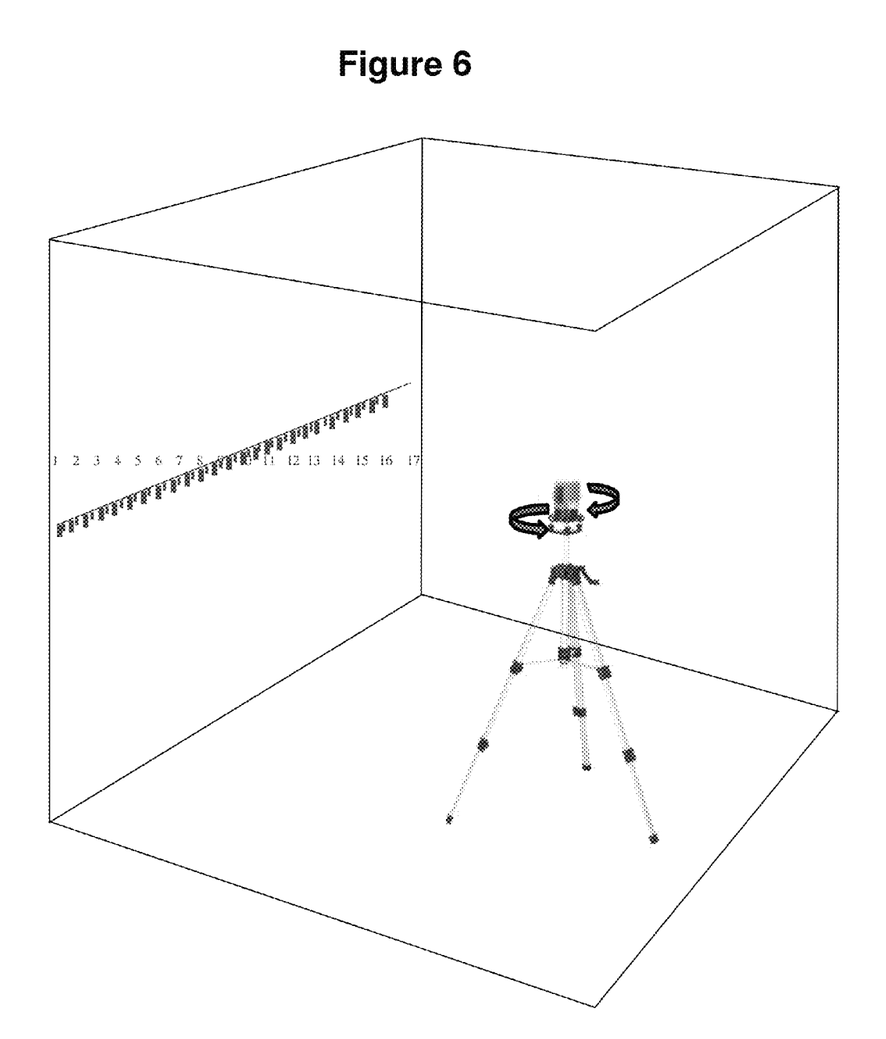
FIG. 6 is the full diagram of the embodiment shown in FIG. 4 in operation wherein the laser is turned on in the measurement mode whereby the ruler image is projected against a wall to be measured.

Referring now to FIG. 5 the embodiment shown in FIG. 3 is shown in operation wherein the device is attached to a tripod and the laser is turned on in the measurement mode and the ruler image (laser tape measure) is projected against a wall (plane) to be measured. The diagram also shows how the laser ruler has the ability to rotate 360 degrees which allows for accurate measurement on any planar surface. The beam of the laser can be rotated by an attachment means of a ball-in-socket pivot Referring now to FIG. 6, the laser is turned on in the measurement mode whereby the ruler image is projected against a ceiling to be measured.

Figure 7:
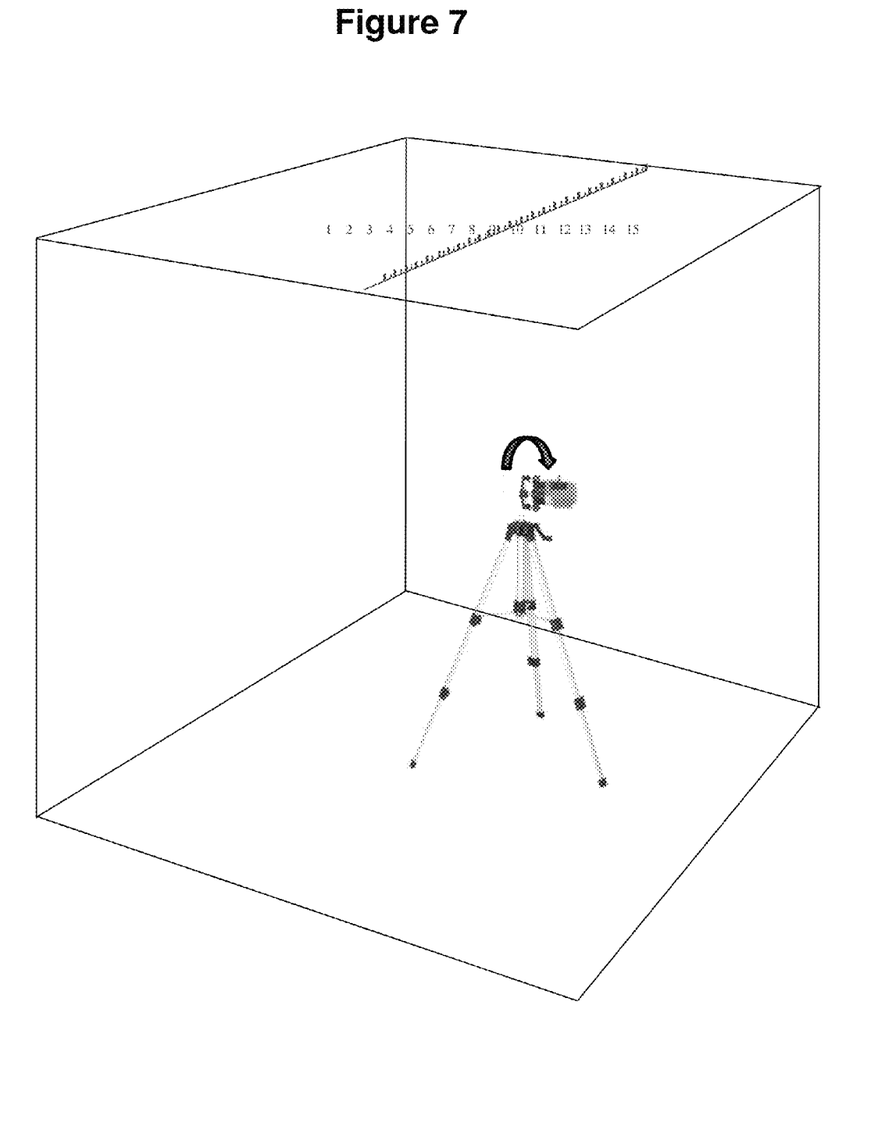
FIG. 7 is the full diagram of the embodiment shown in FIG. 4 in operation wherein the laser is turned on in the measurement mode whereby the ruler image is projected against a ceiling to be measured.

Referring now to FIG. 7 is the full diagram of the embodiment shown in FIG. 4 in operation wherein the laser is turned on in the measurement mode whereby the ruler image is projected against a floor. The telescoping legs on the tripod permit utilization of the device on difficult to access areas such as stairwells, closets, small rooms, etc.

The figures are provided to specifically set forth and define the possible embodiments process of the present invention. It is recognized that changes may be made to the specific mechanical parts, parameters and ranges disclosed herein and that there are a number of different ways known in the art to change the disclosed variables. And whereas it is understood that only the preferred embodiments of these elements are disclosed herein as set forth in the specification and drawings, the invention should not be so limited and should be construed in terms of the spirit and scope of the claims that follow.

What is claimed is:

1. A laser generated measuring device for measuring distances comprising a main outer housing body containing:
    i) a laser source;
    ii) at least one mirror moveably attached to a first motor;
    iii) a second mirror that reflects the laser off the first minor and operationally movable by a second motor;
    iv) one or more range finders,
    v) a programmable micro-controller, and
    vi) a circuit board;

wherein said laser source is configured to project a calibrated laser beam image of a tape measure indicia onto a surface that allows for accurately measuring length, width and height.

2. The laser generated measuring device of claim 1, wherein the one or more range finder lens of the device from which the projected calibrated laser beam exits, the housing body of the unit is comprised of a transparent plastic lens from which a ruled line with tick marks provides correct quantitative values when the laser beam is focused left, right, up and down, and projected on the surface of the plane to be measured.

3. The laser generated measuring device of claim 2 wherein the projected calibrated laser beam is oriented in a fixed position so that the laser beam strikes the planar surface of said first mirror.

4. The laser generated measuring device of claim 3 wherein the calibrated laser beam is oriented in a fixed position so that the calibrated laser beam strikes the planar surface of said first mirror which can be set at different positions or angles, such as height, and width by said first motor.

5. The laser generated measuring device of claim 4 wherein said first mirror is moveably positioned so the laser is oriented so that the calibrated laser beam strikes the planar surface of said second mirror which then guides the laser beam to the range finder.

6. The laser generated measuring device of claim 5 wherein the first motor controls the width of the ruler line by oscillating the motor over a very small angle back and forth that is proportional to the angle of oscillation.

7. The laser generated measuring device of claim 6 wherein the second motor moves minor moves the second mirror in discrete steps with angle theta =tan-1 (I times delta /distance).

8. The laser generated measuring device of claim 7 wherein the first and second motors move the mirrors according to the settings of a microcontroller which is programmable by the user.

9. The laser generated measuring device of claim 8 wherein said micro controller has built in motor drivers and is programmable in the "C" language and loaded on the micro controller via a USB bus.

10. The laser generated measuring device of claim 9 wherein the system also contains four range finders, one for distance to the surface, one each for left and right and one for the ceiling which permits correct quantitative values with respect to left, right and up and down to be projected on the surface.

11. The laser generated measuring device of claim 10 wherein the first motor determines and controls the width of the ruler line by oscillating the first minor over a very small angle back and forth.

12. The laser generated measuring device of claim 11 wherein the length of the ruler line with is proportional to the angle of oscillation.

13. The laser generated measuring device of claim 12 wherein the laser beam emits from the range finders thereby projecting two rulers on the surface at the same time one vertical and one horizontal comprising an entire grid pattern.

14. The laser generated measuring device of claim 13 wherein the laser beam pulses on when the second mirror is stationary and off when it is moving.

15. The laser generated measuring device of claim 14 wherein with the simultaneous use of two range finders, one vertical and one horizontal, it is possible to simultaneous display distance from the walls and from ceiling and floor.

16. The laser generated measuring device of claim 14 wherein two rulers are projected on the intended surface at the same time so that one is vertical and one horizontal.

* * * * *